US006417259B1

(12) United States Patent
Wang et al.

(10) Patent No.: US 6,417,259 B1
(45) Date of Patent: Jul. 9, 2002

(54) POLYALKYLENE GRAFTED CENTIPEDE POLYMERS

(75) Inventors: Xiaorong Wang; Victor J. Foltz, both of Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/586,822

(22) Filed: Jun. 5, 2000

(51) Int. Cl.[7] .................. C08K 5/00; C08K 5/5419; C08L 23/26

(52) U.S. Cl. .................. 524/269; 524/271; 524/504; 525/71; 525/73

(58) Field of Search .................. 524/269, 271, 524/504; 525/71, 73

(56) References Cited

U.S. PATENT DOCUMENTS

| | | | |
|---|---|---|---|
| 2,725,367 A | 11/1955 | Niederhauser et al. | |
| 2,971,934 A | 2/1961 | Brown et al. | |
| 3,244,664 A | 4/1966 | Zelinski et al. | |
| 3,281,383 A | 10/1966 | Zelinski et al. | |
| 3,297,654 A | 1/1967 | Barr et al. | |
| 3,414,551 A | 12/1968 | Reid et al. | |
| 3,428,596 A | 2/1969 | Strand et al. | |
| 3,480,580 A | 11/1969 | Joyner et al. | |
| 3,481,910 A | 12/1969 | Brunson et al. | |
| 3,492,227 A | 1/1970 | Kolaian | |
| 3,528,936 A | 9/1970 | Kent et al. | |
| 3,577,365 A | 5/1971 | Folzenlogen et al. | |
| 3,594,452 A | 7/1971 | De La Marre et al. | |
| 3,751,378 A | 8/1973 | Cowperthwaite et al. | |
| 3,761,458 A | 9/1973 | Holler et al. | |
| 3,796,687 A | 3/1974 | Collette et al. | |
| 3,840,449 A | 10/1974 | Furukawa et al. | |
| 3,862,265 A | 1/1975 | Steinkamp et al. | |
| 3,970,608 A | 7/1976 | Furukawa et al. | |
| 3,985,830 A | 10/1976 | Fetters et al. | |
| 3,998,907 A | 12/1976 | Di Giulio | |
| 4,015,612 A | 4/1977 | Pavlik et al. | |
| 4,017,669 A | 4/1977 | Collette et al. | |
| 4,087,485 A | 5/1978 | Huff | |
| 4,104,332 A | 8/1978 | Zelinksi | |
| 4,132,531 A | 1/1979 | Cummings et al. | |
| 4,139,417 A | 2/1979 | Marie et al. | |
| 4,151,336 A | 4/1979 | Sackmann et al. | |
| 4,151,337 A | 4/1979 | Kanoh et al. | |
| 4,287,314 A | 9/1981 | Fava | 525/130 |
| 4,304,886 A | 12/1981 | Bean et al. | 525/314 |
| 4,374,951 A | 2/1983 | Lee et al. | 525/73 |
| 4,404,321 A | 9/1983 | Abolins et al. | 525/68 |
| 4,404,322 A | 9/1983 | Saito et al. | 525/74 |
| 4,408,010 A | 10/1983 | Le-Khac | 525/73 |
| 4,423,196 A | 12/1983 | Arlt et al. | 526/72 |
| 4,427,828 A | 1/1984 | Hergenrother et al. | 525/66 |
| 4,502,229 A | 3/1985 | Kitzman | 34/56 |
| 4,506,056 A * | 3/1985 | Gaylor | 524/445 |
| 4,540,753 A | 9/1985 | Cozewith et al. | 526/88 |
| 4,585,824 A | 4/1986 | Uchida et al. | 524/494 |
| 4,605,700 A | 8/1986 | Le-Khac | 525/73 |
| 4,683,275 A | 7/1987 | Kato et al. | 526/262 |
| 4,728,463 A | 3/1988 | Sutker et al. | 252/609 |
| 4,732,928 A | 3/1988 | Mizushiro et al. | 524/505 |
| 4,735,992 A | 4/1988 | Nogues | 525/64 |
| 4,771,097 A | 9/1988 | Sackmann et al. | 524/549 |
| 4,772,657 A | 9/1988 | Akiyama et al. | 524/504 |
| 4,889,896 A | 12/1989 | Canova et al. | 525/375 |
| 4,893,055 A | 1/1990 | Fuzzi et al. | 313/479 |
| 4,912,144 A | 3/1990 | McCready | 523/522 |
| 4,921,910 A | 5/1990 | Lunt et al. | 525/74 |
| 4,931,502 A | 6/1990 | McCready | 525/64 |

(List continued on next page.)

FOREIGN PATENT DOCUMENTS

| | | |
|---|---|---|
| AU | B-47913/85 | 4/1986 |
| CA | 702610 | 1/1965 |
| DE | 3430802 A1 | 3/1986 |
| DE | 42 25 875 A1 | 2/1994 |
| DE | 42 39437 A1 | 5/1994 |
| DE | 42 41 538 A1 | 6/1994 |
| EP | 0 177 401 AI | 4/1986 |
| EP | 0322 905 A2 | 7/1989 |
| EP | 0 408 470 A1 | 1/1991 |
| EP | 0 440 922 A1 | 8/1991 |
| EP | 0 536 753 A1 | 4/1993 |
| EP | 0 728 767 A1 | 8/1996 |
| GB | 922151 | 3/1963 |
| JP | 6-248017 | 9/1954 |
| JP | 60-243102 | 12/1985 |
| JP | 6-56921 | 3/1994 |
| JP | 8-255901 | 10/1996 |
| WO | WO 96/23007 | 8/1996 |
| WO | WO 97/00898 | 1/1997 |

OTHER PUBLICATIONS

L.E. Colleman, Jr., J.F. Bork, and H. Donn, Jr., J. Org. Chem., 24, 185 (1959) Reaction of Primary Alphatle Amines with Maleic Anhydride.

A. Matsumoto, Y. Oki, and T. Otsu, Polymer J., 23(3), 201 (1991). Synthesis, Thermal Properties and Gas permeability of Poly(N–n–alkylmalemide)s.

L. Haeussler, U. Wienhold, V. Albrecht, and S. Zschoche, Thermochim. Acta, 277, 14(1996). Simultaneous TA and MS analysis of Alternating Styrene–Maleic Anhydride and Styrene–Malemide Copolymers.

W. Kim and K. Seo, Macromol. Rapid Commun., 17, 835(1996). Synthesis and Photocrosslinking of Maleimide–Type Polymers.

W. Lee, and G. Hwong, J. Appl. Polym. Sci., 59, 599 (1996). Polysulfobetaines and Corresponding Cationic Polymers IV. Synthesis and Aqueous Solution Properties of Cationic Poly (MIQSDMAPM).

Primary Examiner—Ana Woodward
(74) Attorney, Agent, or Firm—David G. Burleson; Scott McCollister

(57) ABSTRACT

The present invention relates to a process of forming a high damping, soft polymer gel. The method involves mixing a polyalkylene grafted poly(alkenyl-co-maleimide) with a poly(alkenyl-co-maleimide) and an extender so as to form a gel.

23 Claims, No Drawings

U.S. PATENT DOCUMENTS

| | | | |
|---|---|---|---|
| 4,996,262 A | 2/1991 | Pyke et al. | 525/177 |
| 5,008,324 A | 4/1991 | Killgoar, Jr. et al. | 524/504 |
| 5,034,449 A | 7/1991 | Mallikarjun | 524/504 |
| 5,037,924 A | 8/1991 | Tazi et al. | 526/272 |
| 5,082,913 A | 1/1992 | Tazi et al. | 526/272 |
| 5,122,161 A | 6/1992 | Benfaremo et al. | 44/348 |
| 5,126,403 A | 6/1992 | Graiver et al. | 525/58 |
| 5,156,920 A | 10/1992 | Aycock et al. | 428/517 |
| 5,202,384 A | 4/1993 | Pyke et al. | 525/167 |
| 5,212,227 A | 5/1993 | Sakazume et al. | 524/504 |
| 5,219,628 A | 6/1993 | Hathaway et al. | 428/36.9 |
| 5,225,498 A | 7/1993 | Sorathia et al. | 525/454 |
| 5,244,971 A * | 9/1993 | Jean-Marc | 525/64 |
| 5,300,569 A | 4/1994 | Drake et al. | 525/78 |
| 5,318,854 A | 6/1994 | Hamersma et al. | 428/483 |
| 5,356,953 A | 10/1994 | Harada et al. | 523/71 |
| 5,373,048 A | 12/1994 | Witzeman et al. | 524/458 |
| 5,414,044 A | 5/1995 | Moriya et al. | 525/74 |
| 5,432,662 A | 7/1995 | Kato et al. | 360/133 |
| 5,472,741 A | 12/1995 | Sackmann et al. | 427/389 |
| 5,489,657 A | 2/1996 | Sue et al. | 525/65 |
| 5,494,964 A | 2/1996 | Meichsner et al. | 525/210 |
| 5,494,981 A | 2/1996 | Gorodisher et al. | 525/504 |
| 5,532,317 A | 7/1996 | Shinmura et al. | 525/73 |
| 5,536,774 A | 7/1996 | Segatta | 524/505 |
| 5,548,031 A | 8/1996 | Doi | 525/327.4 |
| 5,585,434 A | 12/1996 | DeNicola, Jr. et al. | 525/67 |
| 5,585,436 A | 12/1996 | Niessner et al. | 525/105 |
| 5,602,200 A | 2/1997 | Wissmann | 525/66 |
| 5,618,881 A | 4/1997 | Hojabr | 525/64 |
| 5,634,122 A | 5/1997 | Loucks et al. | 395/608 |
| 5,637,410 A | 6/1997 | Bonner et al. | 428/516 |
| 5,651,927 A | 7/1997 | Auda et al. | 264/85 |
| 5,652,307 A | 7/1997 | Niessner et al. | 525/101 |
| 5,654,364 A | 8/1997 | Bates et al. | 525/98 |
| 5,655,820 A | 8/1997 | Kervagoret | 525/83 |
| 5,658,985 A | 8/1997 | Eichenauer et al. | 525/66 |
| 5,665,820 A | 9/1997 | Liestner et al. | 525/66 |
| 5,670,006 A | 9/1997 | Wilfong et al. | 156/236 |
| 5,684,122 A | 11/1997 | Inoue et al. | 528/363 |
| 5,691,411 A | 11/1997 | Khouri et al. | 525/64 |
| 5,710,228 A | 1/1998 | Krause et al. | 526/262 |
| 5,776,234 A | 7/1998 | Schilling | 106/277 |
| 5,783,630 A | 7/1998 | Evans et al. | 525/74 |
| 5,798,413 A | 8/1998 | Spelthann et al. | 526/66 |
| 5,798,414 A | 8/1998 | Mishima et al. | 525/77 |
| 5,821,032 A | 10/1998 | DoMinh | 428/285.1 |
| 5,869,695 A | 2/1999 | Ulmer et al. | 548/545 |
| 5,883,188 A | 3/1999 | Hwang et al. | 525/71 |
| 5,905,116 A | 5/1999 | Wang et al. | 525/74 |
| 5,910,530 A | 6/1999 | Wang et al. | 524/534 |
| 5,912,296 A | 6/1999 | Wang et al. | 524/534 |
| 5,965,666 A | 10/1999 | Koo et al. | 525/66 |
| 6,048,930 A | 4/2000 | Wang et al. | 525/66 |
| 6,204,354 B1 | 3/2001 | Wang et al. | 528/310 |
| 6,248,827 B1 | 6/2001 | Wang et al. | 525/91 |

* cited by examiner

POLYALKYLENE GRAFTED CENTIPEDE POLYMERS

FIELD OF THE INVENTION

The present invention relates to blends of polyalkylene grafted poly(alkenyl-co-maleimide) with poly(alkenyl-co-maleimide) and to the use of such blends, when extended, in producing high damping, soft gel materials.

BACKGROUND OF THE INVENTION

Imidization between a maleic anhydride and a primary amine group is a known chemical reaction. The synthesis of monofunctional N-alkyl and N-aryl maleimides is also known. They have been used to improve the heat stability of homo- and copolymers prepared from vinyl monomers. Typically, the bulk resins include poly(acrylonitrile-co-butadiene-co-styrene), ABS; a polyblend of poly (acrylonitrile-co-butadiene) and poly(styrene-co-acrylonitrile), SAN; poly(vinyl chloride), poly(styrene-co-acrylonitrile); poly(methyl methacrylate); or the like. The maleimides can be copolymerized with other monomers such as acrylonitrile, butadiene, styrene, methyl methacrylate, vinyl chloride, vinyl acetate and many other comonomers. An alternative practice is to produce copolymers of maleimides with other monomers such as styrene and optionally acrylonitrile and to blend these with ABS and SAN resins. In any event, the polymer compositions are adjusted so that the copolymers are fully compatible with the bulk resins (e.g., ABS and/or SAN) as shown by the presence of a single glass transition point ($T_g$) as determined by DSC.

Two or more polymers can be blended together to form a wide variety of random or structured morphologies to obtain products that potentially offer desirable combinations of characteristics. However, obtaining many potential combinations through simple blending may be difficult or even impossible in practice. Frequently, the two polymers are thermodynamically immiscible, which precludes generating a truly homogeneous product. This immiscibility is not always a problem since it can be desirable to have a two-phase structure. However, the situation at the interface between these two phases often lead to problems. The typical case is one of high interfacial tension and poor adhesion between the two phases. This interfacial tension contributes, along with high viscosities, to the inherent difficulty of imparting the desired degree of dispersion to random mixtures and to their subsequent lack of stability, giving rise to gross separation or stratification during processing or use. Poor adhesion leads, in part, to weak and brittle mechanical behavior often observed in dispersed blends and may render some highly structured morphologies impossible.

Provision of an extended grafted copolymer having the impact strength of polypropylene, the elastomeric properties of a block copolymer, high damping properties, and thermostability remains highly desirable.

SUMMARY OF THE INVENTION

The present invention is generally directed to the use of a poly(alkenyl-co-maleimide) to impregnate a polyalkylene grafted poly(alkenyl-co-maleimide) polymer with an extender to form a soft gel composition having damping properties. Such compositions can be useful in producing molded products having heat resistance, high elasticity, and excellent damping properties.

Accordingly, the present invention provides a process for forming a high damping polymer blend. The process includes reacting from about 50 to about 99% (by wt.) of a poly(alkenyl-co-maleimide), from about 1 to about 50% (by wt.) of a maleated polyalkylene-grafted poly(alkenyl-co-maleimide), and from about 0.1 to about 10% (by wt.) of a polyamine under dry conditions sufficient to form a polymer blend. A gel is formed by mixing the polymer blend with an effective amount of extender.

In another aspect, the present invention provides a centipede polymer that includes, or is formed from a mixture that includes, a polyalkylene-grafted poly(alkenyl-co-maleimide), and a poly(alkenyl-co-maleimide).

DETAILED DESCRIPTION OF ILLUSTRATIVE EMBODIMENTS

The polymer and polymer gel of the present invention contains: 100 parts by weight (pbw) of a grafted polymer of a poly(alkenyl-co-maleimide) having at least one maleated polyolefin segment grafted thereto through at least one functional linkage formed by a crosslinking reaction with a diamine grafting agent, from about 10 to about 1,000 pbw of a poly(alkenyl-co-maleimide), and optionally from about 10 to 1,000 pbw of an extender such as oil or a low molecular weight component.

The poly(alkenyl-co-maleimide) used in the impregnation of and in the formation of the graft copolymer is a centipede polymer formed by imidizing a poly(alkenyl-co-maleic anhydride) with at least one primary amine, preferably at least two different primary amines. The centipede polymer has a high molecular weight spine connected with many relatively short side chains. The length of the main chain usually is longer than the entanglement length, which is herein defined theoretically as an order of magnitude of 100 repeating units. The length of the side chains preferably is smaller than or equal to the entanglement length. The alkenyl units of the poly(alkenyl-co-maleimide) centipede polymer are polymers formed from $R_1(R_2)$ethylene monomers or alkenyl benzene monomers such as styrene, or α-methylstyrene, p-methylstyrene, 4-phenylstyrene, m-methylstyrene, p-tert-butylstyrene, dimethylstyrene, and the like. The terms "alkenyl benzene" and "vinyl aromatic" are understood to be interchangeable as used herein. The $R_1(R_2)$ethylene contributed units of the poly($R_1(R_2)$) ethylene-co-maleimide) centipede polymer contain 4 to about 40 carbon atoms wherein $R_1$ and $R_2$ are the same or different substituents on the same or different carbon atom of the ethylene group, selected from unsubstituted and substituted $C_1$–$C_{20}$ alkyl groups. The substituted groups, such as $C_2$–$C_{20}$ alkoxyalkyl groups, are non-reactive with the remaining components of the centipede polymers. Examples of unsubstituted and substituted alkyl groups $R_1$ and $R_2$ in the $R_1(R_2)$ethylenes are independently substituted or unsubstituted alkyl groups containing 1 to 20 carbons such as methyl, ethyl, propyl, isopropyl, butyl, isobutyl, pentyl, isopentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclopropyl, 2,2-dimethylcyclopropyl, cyclopentyl, cyclohexyl, methoxymethyl, methoxyethyl, methoxypropyl, methoxybutyl, methoxypentyl, methoxyhexyl, methoxyheptyl, methoxyoctyl, methoxynonyl, methoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyhexyl, propoxyheptyl, propoxyoctyl, propoxynonyl, propoxydecyl, butoxybutoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxynonyl, pentyloxydecyl, hexyloxymethyl, hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, hexyloxypentyl, heptyloxyhexyl, heptyloxyheptyl, heptyloxyoctyl, heptyloxynonyl, heptyloxydecyl, octyloxymethyl, octyloxyethyl, octyloxypropyl, octyloxybutyl, octyloxypentyl, octyloxyhexyl, octyloxyheptyl, octyloxynonyl, octyloxyoctyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 2-methylbutyl, 2-methylpentyl, 2-methylhexyl, 2-methylheptyl, 2-methyloctyl, 2,3-dimethylbutyl, 2,3,3-trimethylbutyl, 3-methylpentyl, 2,3-dimethylpentyl, 2,4-dimethylpentyl, 2,3,3,4-tetramethylpentyl, 3-methylhexyl, 2,5-dimethylhexyl, and the like. Preferred alkenyl monomers for forming the poly(alkenyl-co-maleic anhydride) are styrene and isobutylene.

The polyalkylene grafted alkenyl/maleimide copolymers can be graft-reacted through a difunctional linking or grafting agent to a maleated polyolefin such as polypropylene and/or polyethylene, to yield a grafted polymer having at least one polyolefin segment grafted thereto through the at least one functional linkage(s) thus formed. The alkenyl/maleimide copolymers may also be only partially grafted with polyalkylene polymers to produce blends containing useful functional groups in the present invention. Particularly preferred for polyalkylene grafting is maleated polypropylene, which can be any conventionally known polypropylene compound that is subsequently maleated by methods known in the art. The polypropylene grafted segment(s) generally have weight average molecular weights ($M_w$) of from about 5000 up to about 10,000,000 or higher, preferably about 20,000 to about 300,000. Suitable commercially available maleated polypropylenes are available from a variety of sources including Sanyo Chem. Co. (Tokyo, Japan), Aldrich Chem. Co. (Milwaukee, Wis.), and Exxon Chem. Co. (Baytown, Tex.).

The crystallinity of the polypropylene can vary from substantially amorphous to completely crystalline, that is from about 10–100% crystallinity. Typically, because of extensive commercial use of isotactic polypropylene, the grafted polypropylene can be substantially crystalline, e.g., greater than about 90% crystallinity. Generally, the polypropylene is substantially free of ethylene although, under certain circumstances, small amounts of ethylene (on the order of less than about 5% by weight) may be incorporated. Furthermore, in certain instances, the polypropylene can contain small amounts of ethylene in copolymers known as reactor copolymers. Thus, the grafted polypropylene can contain minor amounts of ethylene, either as part of ethylene-propylene segments or as polyethylene segments.

Maleinization of polypropylene to maleated polypropylene conveniently can be accomplished by heating a blend of polypropylene and ethylenically unsaturated carboxyl group-containing compounds, e.g., maleic anhydride, within a range of about 150° to 400° C., often in the presence of known free-radical initiators such as organic peroxides. Free radical grafting of the carboxyl group-containing compounds onto the polypropylene readily results. Methods of preparing these grafted polymers are illustrated in, inter alia, U.S. Pat. Nos. 3,480,580, 3,481,910, 3,577,365, 3,862,265, 4,506,056 and 3,414,551 as well as Y. Minoura et al., *J. App. Poly. Sci.* 1625 (1969). The use of heat and/or physical shearing, optionally with the free-radical initiators, in such equipment as extruders, masticators, and the like, to simultaneously accomplish controlled degradation in molecular weight of the polypropylene along with the free radical grafting of the maleic anhydride, also can be useful in accordance with this invention.

The maleated polypropylene generally contains from about 0.01 up to about 5 weight percent incorporated maleic anhydride, based upon the weight of the maleated polypropylene. Preferably, the maleic anhydride content is from about 0.01 to about 2 weight percent, most preferably about 0.03 to about 0.2 weight percent. Unreacted polypropylene also can be present in the reaction mixture as will minor amounts of reaction byproducts, such as decomposed free-radical initiator compounds and low molecular weight free-radical products. These byproducts are substantially removed, by methods known in the art such as, e.g., sparging with nitrogen or washing with water. However, maleic anhydride left in substantial amounts in the polymer can detrimentally affect the subsequent reaction of the poly(alkenyl-co-maleimide) with the maleated polypropylene.

Poly(alkenyl-co-maleimide) can be formed by reacting under substantially dry conditions, at from about 100° to about 300° C. and from about slightly above vacuum to about 20 atmospheres, a polyalkenyl-co-maleic anhydride and at least one primary monoamine. Preferred polymers of this type is poly(alkenyl-co-maleimide) formed by reacting a poly(styrene-co-maleic anhydride), poly(isobutylene-co-maleimide), or poly(methyl vinyl ether-co-maleimide) with at least one primary amine.

For purposes of this invention, poly(alkenyl-co-maleimide) and poly(alkenyl-co-maleic anhydride) encompass random and stereospecific copolymers, including copolymers having alternating alkenyl-contributed units (i.e., mer units derived from an alkenyl benzene such as styrene) and maleimide- or maleic anhydride-contributed units (i.e., mer units derived from a maleimide or maleic anhydride) along the polymer backbone. Such alternating structures typically are described as poly(alkenyl-alt-maleimide) and poly(alkenyl-alt-maleic anhydride); however, these polymers are encompassed herein within the descriptions poly(alkenyl-co-maleimide) and poly(alkyl-co-maleic anhydride).

Processes for forming poly(alkenyl-co-maleic anhydride) polymers are known. Preparation of copolymers from electron donor monomers such as vinyl aromatic hydrocarbons, $R_1(R)_2$ethylenes, or alkyl vinylethers, and from electron acceptor monomers such as maleic anhydride as a result of complexation of the electron acceptor monomers may be carried out in the absence or presence of an organic free radical initiator in bulk, or in an inert hydrocarbon or halogenated hydrocarbon solvent such as benzene, toluene, hexane, carbon tetrachloride, chloroform, etc.

The poly(alkenyl-co-maleic anhydride) contains from about 5 to 99 mole percent of mer units derived from maleic anhydride with the remainder being mer units derived from alkenyl monomer(s). Poly(alkenyl-co-maleic anhydride) preferably contains from 20 to 50 mole percent mer units derived from maleic anhydride, most preferably 50 mole percent mer units derived from maleic anhydride and 50 mole percent mer units derived from alkenyl monomer(s). The comonomers can be randomly or alternately distributed in the chain, although an alternating distribution along the polymer backbone chain is preferred. The poly(alkenyl-co-maleic anhydride) has a $M_w$ of from about 1,000 to about 500,000 or higher, more typically between about 10,000 and 500,000, and even more typically between about 150,000 and 450,000.

The reactants are preferably dry mixed in the absence of solvents in a suitable mixing apparatus such as a Brabender mixer which preferably has purged with an inert gas. The primary amine may be added in a singular charge or in sequential partial charges into a reactor containing a charge of poly(alkenyl-co-maleic anhydride). Preferably, the primary amine is charged in ratio between 0.8 to 1.0 moles of amine per mer units derived from maleic anhydride in the poly(alkenyl-co-maleic anhydride).

Using two different primary monoamines, such as octylamine and oleylamine, in the preparation of the poly(alkenyl-co-maleimide) can be preferred. Similarly, the same or different poly(alkenyl-co-maleimides) can be used in the preparation of the polyalkylene graft copolymer and to impregnate or blend with the graft copolymer.

Suitable primary amines include but are not limited to alkyl amines; alkyl benzyl amines; alkyl phenyl amines; alkoxybenzyl amines; alkyl aminobenzoates; alkoxy aniline; and other linear or branched primary amines containing from 1 to 50 carbon atoms, preferably 6 to 30 carbon atoms, in the alkyl and alkoxy substituents. The alkyl and alkoxy substituents on these primary amines can be linear or branched and saturated or unsaturated; however no aromatic rings may be directly bonded to the amine group. Exemplary amines include hexylamine, octylamine, dodecylamine, and the like.

The poly(alkenyl-co-maleimide), prior to grafting with maleated polypropylene, preferably has a $M_w$ of from about 1,000 to about 500,000 or higher, more typically of from about 10,000 to 500,000, and even more typically of from about 150,000 to 450,000.

Copolymers, such as those of the instant invention, can be prepared by any means known in the art such as blending, milling, or internal batch mixing. A rapid and convenient method of preparation involves heating a mixture of the components to a temperature of from about 50° to about 290° C. Such polymers can be made by mixing and dynamically heat-treating the components described above. As for the mixing equipment, any conventional, generally known equipment such as an open-type mixing roll, closed-type Banbury mixer, closed type Brabender mixer, extruding machine, kneader, continuous mixer, etc., is acceptable. Mixing in an inactive gas environment, such as $N_2$ or $CO_2$, also is preferable.

Grafting of maleated polyalkylene and poly(alkenyl-co-maleimide) is performed by adding a grafting agent containing at least two functional groups. Suitable functional groups include primary amine, secondary amine, carboxyl, formyl, and hydroxyl. The preferred functional groups are amines such as a polyamine, preferably an organic diamine. The grafting agent is added to a blend of maleated polyalkylene and poly(alkenyl-co-maleimide) to partially cross-link the polyalkylene to the poly(alkenyl-co-maleimide) through the maleate functional groups.

Suitable organic diamines or diamine mixtures containing two aliphatically- or cycloaliphatically-bound primary amino groups can be used as grafting agents. Such diamines include, e.g., aliphatic or cycloaliphatic diamines corresponding to the general formula $R_1(NH_2)_2$ in which $R_1$ represents a $C_2$–$C_{20}$ aliphatic hydrocarbon group, a $C_4$–$C_{20}$ cycloaliphatic hydrocarbon group, or a $C_6$–$C_{20}$ aromatic hydrocarbon group, or $R_1$ represents a $C_4$–$C_{20}$ N-heterocyclic ring such as, e.g., ethylene diamine; 1,2- and 1,3-propylene diamine, 1,4-diaminobutane, 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane; 1,11-diaminoundecane; 1,12-diaminododecane; 1-methyl-4-(aminoisopropyl)-cyclohexylamine; 3-aminomethyl-3,5,5-trimethyl-cyclohexylamine; 1,2-bis-(aminomethyl)-cyclobutane; 1,2-diamino-3,6-dimethylbenzene; 1,2- and 1,4-diaminocyclohexane; 1,2-, 1,4-, 1,5-, and 1,8-diaminodecalin; 1-methyl-4-aminoisopropyl-cyclohexylamine; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)ethane; 3,3',5,5'-tetramethyl-bis-(4-aminocyclohexyl)-methane and -propane; 1,4-bis-(2-aminoethyl)-benzene, benzidine, 4,4'-thiodianiline, 3,3'-dimethoxybenzidine, 2,4-diaminotoluene, diaminoditolylsulfone; 2,6-diaminopyridine; 4-methoxy-6-methyl-m-phenylenediamine; diaminodiphenyl ether; 4,4'-bis-(o-toluidine); o-phenylenediamine; o-phenylenediamine, methylenebis(o-chloroaniline); bis(3,4-diaminophenyl) sulfone; diaminodiphenylsulfone; 4-chloro-o-phenylenediamine; m-amino-benzylamine; m-phenylenediamine; 4,4'-$C_1$–$C_6$-dianiline such as 4,4'-methylenedianiline; aniline-formaldehyde resin; and trimethylene glycol di-p-aminobenzoate.

Other suitable polyamines for use as grafting agents include bis-(aminoalkyl)-amines, preferably those having a total of from 4 to 12 carbon atoms, e.g., bis-(2-aminoethyl)-amine, bis-(3-aminopropyl)-amine, bis-(4-aminobutyl)-amine and bis-(6-aminohexyl)-amine, and isomeric mixtures of dipropylene triamine and dibutylene triamine. Hexamethylene diamine, tetramethylene diamine, and especially 1,12-diaminododecane, are preferred.

A preferred embodiment of the process for preparing the polymer and high damping gel material of this invention includes the steps of:

a) combining a poly(alkenyl-co-maleic anhydride) and a primary amine under substantially dry conditions sufficient to react substantially most of the acid anhydride moieties to form a poly(alkenyl-co-maleimide);

b) adding a maleated polyalkylene under substantially dry conditions at an elevated temperature;

c) adding a diamine under agitation sufficient to form a grafted polymer and cooling; and, d) adding another poly(alkenyl-co-maleimide) and optionally an extender such as an oil or low molecular weight component to the resultant graft polymer under agitation.

It is believed that the grafting reaction is accomplished by contacting the grafting agent and the poly(alkenyl-co-maleimide) with the maleated polyalkylene, whereupon interaction and crosslinking take place. The primary amino groups of the grafting agent apparently react to form covalent chemical bonds (imide bonds) with the maleic moieties of the maleated polyalkylene and the residual maleate groups in the poly(alkenyl-co-maleimide). The polyalkylene is thus grafted to the poly(alkenyl-co-maleimide) through covalent chemical functional linkages.

For best results, a proportion of approximately one-half molar equivalent of grafting agent per molar equivalent of maleic moiety can be employed due to the difunctionality of the grafting agent. The contacting can be accomplished by combining solutions of the polymeric reactants in suitable solvents, such as benzene, toluene, and other inert organic and inorganic solvents, in a suitable reaction vessel under substantially anhydrous conditions. Heating accelerates the reaction and is generally preferred. More preferably, contacting can be accomplished by premixing pre-formed pellets of the neat functionalized polymers and adding the grafting agent and melt processing in a physical blender or mixer at temperatures of from about 20° to about 350° C., preferably about 75° to about 300° C., most preferably 120° to about 250° C. Preferably, essentially all moisture or water is removed by drying prior to contacting the polymer reactants so that hydrolysis reactions (which compete with the desired cross linking, slow the grafting reaction, and reduce the yield of the grafted copolymer composition of this invention) can be avoided.

Amounts of poly(alkenyl-co-maleimide) and maleated polyalkylene reacted into the grafted compositions of the invention may vary somewhat depending upon the properties desired in the finished composition. In general, amounts of maleated polyalkylene included in the grafted composition may range from about 1 to about 50 percent by weight based on total weight of composition. Preferred amounts of maleated polypropylene are from 1 to 30% (by wt.) with a particularly preferred amount being from 10 to 25% (by wt.). The amounts of poly(alkenyl-co-maleimide) centipede polymer included in the grafted composition may range from about 99 to about 50% (by wt.) based on total weight of composition. Preferred amounts of the centipede polymer are from 99 to 70% (by wt.) with a particularly preferred amount being from 90 to 75% (by wt.).

The gas maleated polyalkylene grated poly (alkenyl-cl-maleimide) can be the reaction product of from about 50 to about 90 weight percent of a poly (alkenyl-co-maleimide) and from about 10 to about 50 weight percent of a polyamine.

The centipede polymers have a poly(alkenyl-co-maleimide) added to the prepared polyalkylene-grafted poly (alkenyl-co-maleimide) in an amount ranging from at least about 10 pbw, preferably 30 to 1,000 pbw, of the poly (alkenyl-co-maleimide) per 100 pbw of the polyalkylene-grafted poly(alkenyl-co-maleimide) added during final processing.

In accordance with the present invention, the grafted polymer containing gel composition has added thereto extenders such as extender oils and low molecular weight compounds or components. Suitable extender oils include those well known in the art such as naphthenic, aromatic and paraffinic petroleum oils and silicone oils. These extenders are added in amounts of at least about 1 pbw, preferably 30 to 1000 pbw, of extender per 100 pbw of the polyalkylene grafted copolymers. Most preferred amounts of extender include from about 50 to about 500 pbw of extender per 100 pbw of polyalkylene grafted copolymer and ideally about 80 to about 300 pbw of extender per 100 pbw of polyalkylene grafted copolymer. The weight percent ratio of the polyalkylene grafted poly(alkenyl-co-maleimide) to the total amount of extender is from about 100:1 to about 1:100, preferably from about 5:1 to about 1:5.

About 10 to about 90 weight percent of said polyalkylene grafted poly (alkenyl-co-maleimide) can be mixed with from about 90 weight percent to about 10 weight percent of the extender.

Examples of low molecular weight organic compounds or components useful as extenders in the compositions of the present invention are low molecular weight organic materials having a number average molecular weight ($M_n$) of less than 20,000, preferably less than 10,000, and most preferably less than 5,000. Although there is no particular limitation to the material that may be employed, the following is a list of exemplary appropriate materials:

1) softening agents, namely aromatic naphthenic and paraffinic softening agents for rubbers or resins;
2) plasticizers, namely plasticizers composed of esters including phthalic, mixed phthalic, aliphatic dibasic acid, glycol, fatty acid, phosphoric and stearic esters, epoxy plasticizers, other plasticizers for plastics, and phthalate, adipate, sebacate, phosphate, polyether, and polyester plasticizers for NBR;
3) tackifiers, namely coumarone resins, coumarone-indene resins, terpene phenol resins, petroleum hydrocarbons, and rosin derivative;
4) oligomers, namely crown ether, flourine-containing oligomers, polybutenes, xylene resins, chlorinated rubber, polyethylene wax, petroleum resins, rosin ester rubber, polyalkylene glycol diacrylate, liquid rubber (polybutadiene, SBR, butadiene-acrylonitrile rubber, polychloroprene, etc.), silicone oligomers, and poly(α-olefins);
5) lubricants, namely hydrocarbon lubricants such as paraffin and wax, fatty acid lubricants such as higher fatty acid and hydroxy-fatty acid, fatty acid amide lubricants such as fatty acid amide and alkylene-bis-fatty acid amide, ester lubricants such as fatty acid-lower alcohol ester, fatty acid-polyhydric alcohol ester and fatty acid-polyglycol ester, alcoholic lubricants such as fatty alcohol, polyhydric alcohol, polyglycol and polyglycerol, metallic soaps, and mixed lubricants; and,
6) petroleum hydrocarbons, namely synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins.

Other appropriate low molecular weight organic materials include latexes, emulsions, liquid crystals, bituminous compositions, polymers, and phosphazenes. One or more of these materials may be used as extenders.

Polymer gels produced according to the present invention generally have high damping properties having a tan δ in the range of about 0.3 to about 1.0 over the temperature range of −10° to 100° C., and about 0.5 to 0.9 over the temperature range of 5° to 45° C., and a Shore A hardness at about 23° C. (i.e., room temperature) ranging from 0 to about 50, preferably from about 0 to about 30, most preferably from about 5 to 20. The service temperature of the gels of the present invention is less than or equal to 100° C. Some of the extended polymers of the present invention have a potential use up to 140° C. The gels can display a compression set at 100° C. of up to 50%.

Frequently, including other additives known in the rubber art to the compositions of the present application can be desired. Stabilizers, antioxidants, conventional fillers, reinforcing agents, reinforcing resins, pigments, fragrances, and the like are examples of some such additives. Specific examples of useful antioxidants and stabilizers include 2-(2'-hydroxy-5'-methylphenyl) benzotriazole, nickel dibutyldithiocarbamate, zinc dibutyl dithiocarbamate, tris (nonylphenyl) phosphite, 2,6-di-t-butyl-4-methylphenol and the like. Exemplary conventional fillers and pigments include silica, carbon black, titanium dioxide, iron oxide, and the like. These compounding ingredients are incorporated in suitable amounts depending upon the contemplated use of the product, preferably in the range of 1 to 350 parts of additives or compounding ingredients per 100 parts of grafted copolymer.

A reinforcing material can be defined as a material added to a resinous matrix to improve the strength of the polymer. Most reinforcing materials are inorganic or high molecular weight organic products. Examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion and processability. Examples of other elastomers and resins include adhesive-like products, hydrogenated polystyrene-(medium or high 3,4)-polyisoprene-polystyrene block copolymers, polynorbornenes, and the like. The foregoing materials also can be used in the centipede polymer compositions.

Gels containing polyalkylene grafted poly(alkenyl-co-maleimide), poly(alkenyl-co-maleimide), and an oil or low molecular weight component extender can be prepared by any means known in the art for combining such ingredients, such as solution blending, milling, internal batch mixing, or continuous extrusion of a solid form of the centipede polymer and polypropylene compositions and the other ingredients. A rapid and convenient method of preparation involves heating a mixture of the components to a temperature of from about 50° to about 290° C.

Gels containing oil-extended polyalkylene grafted poly (alkenyl-co-maleimide) compositions can be manufactured by mixing and dynamically heat treating the components described above. As for the mixing equipment, any conventional equipment such as an open-type mixing roll, closed-type Banbury mixer, extruding machine, kneader, continuous mixer, etc., is acceptable. Mixing in an inactive gas environment, such as $N_2$ or Ar, is also preferable.

The composition of the present invention can be mixed in any conventional mixer such as a Banbury mixer or roll mill or extruder normally conducted at a temperature of from about 120° to about 300° C., preferably maintaining the composition above its melting point for a few minutes up to several hours, preferably 10 to 40 minutes. A particularly useful technique is to add any fillers in the beginning of the mixing cycle to take maximum advantage of heating time and to prevent surface bleeding and overheating when forming the molded articles.

The resultant gel composition may be molded in appropriate press ovens and the like to form products in the form of extruded pellets, preferably as small as possible since smaller pellets provide short heating times and better flow when utilized in flow molding. Ground pellets may also be utilized.

The extended grafted centipede polymers can be used in high temperature applications including uses in injection molding or in any other compositions typically used for elastomeric properties. Of course, molded polymers produced from gels containing poly(alkenyl-co-maleimide) blended with polyalkylene grafted poly(alkenyl-co-maleimide) compositions retain elastomeric characteristics and are useful in high temperature applications and/or high damping applications.

A convenient measurement of damping is the parameter tan δ. A forced oscillation is applied to a material at frequency and the transmitted force and phase shift are measured. The phase shift angle delta is recorded. The value of tan δ is proportional to the ratio of energy dissipated to energy stored. The measurement can be made by any of several commercial testing devices, and may be made by a sweep of frequencies at a fixed temperature, then repeating that sweep at several other temperatures, followed by the development of a master curve of tan δ vs. frequency by curve alignment. (An alternate method is to measure tan δ at constant frequency (such as at 10 Hz) over a temperature range.) For present purposes, a thermoplastic unfilled material is useful for damping when its tan δ greater than approximately 0.3 over at least a 4 decade range, preferably a 6 decade range, of frequencies.

Advantageously, this high degree of absorption of energy can be accompanied by good mechanical and thermal stability. These properties are important because parts made from the subject polymers often are repeatedly cycled through various environments and subjected to various forces of compression, tension, bending, and the like.

The composition of the present invention can be used in the manufacture of any product in which one or more of a high degree of softness, heat resistance, decent mechanical properties, elasticity, and high damping is important. The composition can be used in all industry fields, in particular, in the fabrication of automotive parts, tire tread rubbers, house-hold electrical appliances, industrial machinery, precision instruments, transport machinery, constructions, engineering, and medical instruments.

Representative examples of the use of the extended graft polymers of the present invention are damping materials and vibration restraining materials. These uses involve connecting materials such as sealing materials, packing, gaskets and grommets, supporting materials such as mounts, holders and insulators, and cushion materials such as stoppers, cushions, and bumpers. These materials are also used in equipment producing vibration or noise and household electrical appliances, such as in air-conditioners, laundry machines, refrigerators, electric fans, vacuums, dryers, printers and ventilator fans. Further, these materials are also suitable for impact absorbing materials in audio equipment and electronic or electrical equipment, sporting goods and shoes. Further, as super low hardness rubbers, these materials are applicable for use in appliances, damping rubbers, and as low hardness plastics, it is preferable for molding materials. Further, because the present compositions can be used to control the release of internal low molecular weight materials out from the compositions, it is useful as a release support to emit materials such as fragrance materials, medical materials and other functional materials. The compositions of the present invention also possess utility in applications of use in liquid crystals, adhesive materials and coating materials.

Specific examples of uses of the compositions of the present invention as damping materials include in audio equipment, such as in insulators for a portable CD or a CD mounted on a vehicle, mike holders for home video cassette recorder, radio cassette recorder, karaoke or handy mike, etc., an edge cone of a speaker, a tape holder of a radio cassette, a holder of a portable mini-disk player, an optical disk holder of a digital video disk, etc.;

in information relating equipment, such as in insulators for a hard disk, insulators for motors such as a spindle motor for HHD and stepping motor, insulators for floppy disk drive, insulators for CD-ROM of personal computer, and a holder for optical disk;

in communication equipment, such as in a holder for compact high performance mike or speaker of a portable telephone, a pocket bell or PHS, a microphone holder for a wireless equipment, and a disk holder for portable note type electronic equipment, in home electronics equipment, such as in insulators for CD-ROM of home TV game, insulators for cassette holder or CD-ROM of cassette holder or game machine, a holder of high performance mike, and cone edge of speaker; and in other applications, such as in damping materials for printer head of a word processor, printer of personal computer, small or middle handy type printer, or name printers, and insulators for CD-ROM used for measure equipment.

The present invention is described in more detail with reference to the following non-limiting examples.

EXAMPLES

Example 1

Poly(stryene-alt-n-alkylmaleimde) Centipede Polymer

A 6L MXE-6 kneader-extruder (Jaygo Inc.; Union, N.J.) equipped with sigma blades was initially set to a blade speed of 25 rpm, a screw speed of 66 rpm and a temperature of 65° C. The mixer was charged with about 1.36 kg Scripset™ 520 poly(styrene-alt-maleic anhydride having a $M_n$ of 350,000 (Monsanto Chem. Co.; St. Louis, Mo.), about 0.77 kg octylamine (Aldrich), and about 0.17 kg oleylamine (Aldrich).

After 10 minutes of continuous mixing, one liter of water was added and mixing was continued for another 10 minutes as the temperature was raised to 100° C. Water vapor generated during the reaction was vented though a 0.64 cm pore vent in the lid of the mixer.

After an additional 10 minutes of mixing, the mixture was allowed to heat up at a rate of about 3° C./minute. Once the temperature reached 200° C., the heating element was set at isothermal conditions for an additional 2 hours. The heating element of the mixer was turned off, and the polymer mass within the mixer was permitted to cool to 100° C.

A 10 g sample of the centipede polymer product mass was removed from the mixer and analyzed using Fourier Transform Infrared Spectrometer (FTIR). IR absorption peaks characteristic of the polymer mass were noted at 705 $cm^{-1}$, 1701 $cm^{-1}$, 1770 $cm^{-1}$, 2855 $cm^{-1}$ and 2926 $cm^{-1}$. No trace of absorption peaks from maleic anhydride or amino-groups was detected, thus indicating that the components were fully reacted.

A charge of 1.66 kg of di(tridecyl)phthalate oil (C.P. Hall Co., Chicago, Ill.), hereinafter DTDP, was added to the remaining centipede polymer mass and mixed. After 30 minutes, the final product was extruded through a 0.64 cm die.

Example 2

Polypropylene Grafted Poly(isobutylene-alt-n-alkylmaleimde)

A 6L kneader-extruder (MXE-6) equipped with sigma blades was initially set to a blade speed of 25 rpm, a screw speed of 40 rpm, and a temperature of 54° C. The mixer was charged with about 1.25 kg Isoban™-10 poly(isobutylene-alt-maleic anhydride) (Kurary Co. Ltd.; Tokyo, Japan) and about 0.99 kg of octylamine (Aldrich). After 5 minutes, the temperature was increased at a rate of 3° C./minute.

Once the temperature reached 190° C., the heating element was set at isothermal conditions for an additional 2 hours. A charge of about 0.56 kg of PO1015 maleated polypropylene (Exxon) was added to the mixer.

After 30 minutes, 23 g of dodecane diamine (Aldrich) was added. After an additional 15 minutes, about 1.40 kg of DTDP oil, was added to the mixer and the temperature was adjusted to 160° C. After 2 hours, the product was removed from the mixer by extrusion through a 0.64 cm die.

Examples 3–5

A charge of 25 g of the grafted polymer product of Example 2 was added with $N_2$ purging to a Brabender mixer (55 g capacity) equipped with a roller blade and initially set to 160° C. and 60 rpm. After five minutes, 25 g of the product from Example 1 was added. The material was then mixed for 30 minutes before agitation was discontinued, and the product was removed from the mixer. This material is designated "Example 3" in the table that follows.

The procedure of Example 3 was repeated except that the final mixing step was conducted for 60 minutes. This material is designated "Example 4" in the table that follows.

The procedure of Example 3 was repeated except that the mixer was charged with 35 g of the product from Example 2 and 15 g of the product from Example 1. This material is designated "Example 5" in the table that follows.

The products from Examples 3 to 5 were molded into sheets and cylinder buttons at about 160° C. Ring samples having a width of about 0.18 cm, a thickness of 0.19 cm, and a perimeter of about 7.62 cm were cut from these sheets for tensile measurements. Various physical properties, including tensile strength at break ($T_b$) and elongation at break ($E_b$) of the ring samples were measured and are summarized in the table below. (Compression set was measured in accordance with ASTM D395-89 except that the sample height and diameter were 1.3 cm (0.5 in.) and 1.4 cm (0.55 in.) respectively. The samples were compressed to 0.95 cm (0.375 in.) and stored at 100° C. for 22 hours. When the samples were removed from the oven, the stress thereon was relieved, and the samples were stored at room temperature for 30 minutes. Recovery was measured as the final sample height ($h_f$), and the compression set (CS) was determined according to the formula CS=100[($0.5-h_f$)/($0.5-0.375$)].)

TABLE 1

|  | Ex. 3 | Ex. 4 | Ex. 5 |
| --- | --- | --- | --- |
| PP content (wt %) | 10 | 10 | 14 |
| CS | 54.2% | 54.2% | 41.2% |
| $T_b/E_b$ (psi/%) | 143/445 | 141/474 | 202/371 |
| Tan δ, 5° C. | 0.83 | 0.85 | 0.89 |
| Tan δ, 25° C. | 0.90 | 0.90 | 0.90 |
| Tan δ, 45° C. | 0.88 | 0.82 | 0.75 |
| Shore A hardness (25° C.) | 5 | 5 | 10 |

As can be seen in Table 1, the products were soft and thermoreversible gels. These materials exhibited very well balanced tensile strength, damping properties, and thermo-stabilities. Finally, it is noteworthy that all materials shown in the table were thermally recyclable at 160° C. and have a service temperature up to 100° C.

We claim:

1. A process for forming a centipede polymer blend comprising:
    a) reacting under dry conditions a poly(alkenyl-co-maleimide), a maleated polyalkylene, and a polyamine sufficient to form a polyalkylene grafted poly(alkenyl-co-maleimide) centipede polymer; and b) adding a poly(alkenyl-co-maleimide) and, optionally, an extender.

2. The process of claim 1 further comprising first mixing from about 10 to about 90 weight percent of said polyalkylene grafted poly(alkenyl-co-maleimide) centipede polymer with from about 90 wt % to about 10 wt % of the extender.

3. The process of claim 1 wherein the alkenyl monomer units of said poly(alkenyl-co-maleimide) are selected from the group consisting of styrene, α-methylstyrene, p-methylstyrene, 4-phenylstyrene, m-methylstyrene, p-tert-butylstyrene, dimethylstyrene, and $R_1(R_2)$ethylene wherein $R_1$ and $R_2$ are independently substituted or unsubstituted $C_1$–$C_{20}$ alkyl groups, and mixtures thereof.

4. The process of claim 1 wherein said maleated polyalkylene comprises monomer units selected from the group consisting of ethylene, propylene, and mixtures thereof.

5. The process of claim 1 wherein the maleimide units of said poly(alkenyl-co-maleimide) are formed by the reaction of maleic anhydride and at least one primary amine.

6. The process of claim 5 wherein the primary amine is selected from the group consisting of alkyl amines, alkyl benzyl amines, alkyl phenyl amines, alkoxybenzyl amines, alkyl aminobenzoates, alkoxy anilines, and mixtures thereof, wherein the alkyl and alkoxy substituents in the primary amine contain from 1 to 50 carbon atoms.

7. The process of claim 1 wherein said polyamine is selected from aliphatic and cycloaliphatic diamines corresponding to the formula $R_1(NH_2)_2$ wherein $R_1$ represents a $C_2$–$C_{20}$ aliphatic hydrocarbon group, a $C_4$–$C_{20}$ cycloaliphatic hydrocarbon group, a $C_6$–$C_{20}$ aromatic hydrocarbon group, or a $C_4$–$C_{20}$ N-heterocyclic ring having from 4 to 20 carbon atoms.

8. A centipede polymer gel composition comprising a mixture of, or formed from a mixture comprising, a polyalkylene grafted poly(alkenyl-co-maleimide), a poly (alkenyl-co-maleimide) and an effective amount of an extender.

9. The composition of claim 8 comprising 100 parts by weight of said grafted poly(alkenyl-co-maleimide) and from about 10 to about 1,000 parts by weight of said poly(alkenyl-co-maleimide).

10. The composition of claim 8 wherein the weight percent ratio of said grafted poly(alkenyl-co-maleimide) to said extender is from about 100:1 to about 1:100.

11. The gel composition of claim 8 wherein said grafted poly(alkenyl-co-maleimide) comprises the reaction product of from about 50 to about 90 weight percent of a poly (alkenyl-co-maleimide), from about 10 to about 50 weight percent of a maleated polyalkylene, and from about 0.01 to about 10 weight percent of a polyamine.

12. The gel composition of claim 11 wherein the monomer from which the alkylene moiety of said maleated polyalkylene is formed is chosen from the group consisting of ethylene, propylene, and mixtures thereof.

13. The gel composition of claim 11 wherein said polyamine is chosen from the group consisting of ethylene diamine; 1,2- and 1,3-propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane; 1,11-diaminoundecane; 1,12-diaminododecane; 1-methyl-4-(aminoisopropyl)-cyclohexylamine; 3-aminomethyl-3,5,5-trimethyl-cyclohexylamine; 1,2-bis-(aminomethyl)-cyclobutane; 1,2-diamino-3,6-dimethylbenzene; 1,2- and 1,4-diaminocyclohexane; 1,2-, 1,4-, 1,5-, and 1,8-diaminodecalin; 1-methyl-4-aminoisopropyl-cyclohexylamine; 4,4'-diamino-dicyclohexyl; 4,4'-diamino-dicyclohexyl methane; 2,2'-(bis-4-amino-cyclohexyl)-propane; 3,3'-demethyl-4,4'-diaminodicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline; 3,3'-dimethoxybenzidine; 2,4-diamiontoluene, diaminoditilylsulfone; 2,6-diaminopyridine; 4-methoxy-6-methyl-m-phenylenediamine; diamiondiphenylether; 4,4'-bis-(o-chloroanilene); bis-(3,4-dimaionphenyl)sulfone; diaminodiphenylsulfone; 4-chloro-o-phenylenediamine; m-aminobenzylamine; m-phenylenediamine; 4,4'-$C_1$–$C_6$-dianiline; 4,4'-methylenedianiline; aniline-formaldehyde resin; trimethylene glycol di-p-aminobenzoate; bis-(2-aminoethyl)-amine, bis-(3-amionpropyl)-amine; bis-(4-aminobutyl)-amine; bis-(6-aminohexyl)-amine; isomeric mixtures of dipropylene triamine and dibutylene triamine; and mixtures thereof.

14. The gel composition of claim 8 wherein the monomer from which the alkenyl moiety of said poly(alkenyl-co-maleimide) is formed is chosen from the group consisting of styrene, α-methylstyrene, p-methylstyrene, 4-phenylstyrene, m-methylstyrene, p-tert-butylstyrene, dimethylstyrene, and $R_1(R_2)$ethylene wherein $R_1$ and $R_2$ independently are substituted or unsubstituted $C_1$–$C_{20}$ alkyl groups, and mixtures thereof.

15. The gel composition of claim 8 wherein said gel has a tan δ of from about 1.0 to about 0.3 over the temperature range of −10° to 100° C.

16. The gel composition of claim 8 wherein said gel has a tan δ of from about 0.9 to about 0.5 over the temperature range of 5° to 45° C.

17. The gel composition of claim 8 wherein said gel has a Shore A hardness of from about 0 to about 50 at a temperature of from about 23° C.

18. The gel composition of claim 8 further comprising at least one additive chosen from the group consisting of stabilizers, antioxidants, fillers, reinforcing agents, reinforcing resins, pigments, fragrances, and mixtures thereof.

19. The gel composition of claim 8 wherein said extender is chosen from the group consisting of softening agents, plasticizers, tackifiers, oligomers, lubricants, petroleum hydrocarbons, silicone oil, aromatic oil, naphthenic oil, paraffinic oil, and mixtures thereof.

20. A centipede polymer comprising a mixture of, or formed from a mixture comprising, a maleated polyalkylene grafted poly (alkenyl-co-maleimide), and a poly (alkenyl-co-maleimide).

21. The centipede polymer of claim 20 comprising:
 a. a poly(alkenylbenzene-co-maleimide) grafted to a maleated polypropylene,
 b. a polyamine,
 c. a poly(alkenyl-co-maleimide), and
 d. optionally, an extender.

22. The centipede polymer of claim 20 comprising:
 a. a poly($R_1R_2$ethylene-co-maleimide) grafted to a maleated polyalkylene,
 b. a polyamine,
 c. a poly(alkenyl-co-maleimide), and
 d. optionally, an extender.

23. A centipede polymer composition comprising:
 a. a poly(alkyl vinyl ether-co-maleimide) grafted to a maleated polyalkylene,
 b. a diamine,
 c. a poly(alkenyl-co-maleimide), and
 d. optionally, an extender.

* * * * *